(12) United States Patent
Yoshikawa (10) Patent No.: US 7,480,379 B2
(45) Date of Patent: Jan. 20, 2009

(54) MOBILE ELECTRONIC EQUIPMENT

(75) Inventor: Masahide Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 713 days.

(21) Appl. No.: 11/088,875

(22) Filed: Mar. 25, 2005

(65) Prior Publication Data
US 2005/0219216 A1  Oct. 6, 2005

(30) Foreign Application Priority Data
Mar. 31, 2004  (JP) .............................. 2004-102368

(51) Int. Cl.
*H04M 1/00* (2006.01)
*H04M 9/00* (2006.01)

(52) U.S. Cl. ........................ 379/433.06; 379/433.13; 455/575.3

(58) Field of Classification Search ............ 379/433.01, 379/433.06, 433.13; 455/90.3, 575.1, 575.3, 455/575.4; 16/321, 327, 330, 333
See application file for complete search history.

(56) References Cited

U.S. PATENT DOCUMENTS

| | | | |
|---|---|---|---|
| 5,290,966 A | 3/1994 | Aoki | 84/626 |
| 5,841,849 A | 11/1998 | Macor | |
| 6,097,372 A | 8/2000 | Suzuki | 345/167 |
| 6,560,469 B1 | 5/2003 | Kim et al. | 455/569 |

FOREIGN PATENT DOCUMENTS

| | | |
|---|---|---|
| EP | 0 725 360 A1 | 7/1996 |
| GB | 2 318 945 A | 6/1998 |
| JP | 10-254617 | 9/1998 |
| JP | H11-031048 | 2/1999 |
| JP | 2001-16635 | 1/2001 |
| JP | 2001-016635 | 1/2001 |
| JP | 2001-168971 | 6/2001 |
| JP | 2001-237941 | 8/2001 |
| JP | 2002-55760 | 2/2002 |
| JP | 2002-135380 | 5/2002 |

(Continued)

OTHER PUBLICATIONS

The European Search Report mailed on Jun. 6, 2007, pp. 1 to 3.

(Continued)

*Primary Examiner*—Curtis Kuntz
*Assistant Examiner*—Tuan D Nguyen
(74) *Attorney, Agent, or Firm*—Whitham Curtis Christofferson & Cook, PC (57) ABSTRACT

In an mobile electronic equipment in which an upper cabinet is openably and closably coupled with a lower cabinet, cutout portions from which a track ball is exposed are formed to the coupling portions of the upper and lower cabinets, and the track ball is interposed between a pair of hinge mechanisms for connecting both the cabinets to each other. With this arrangement, since the track ball is exposed in any of the opened state and the closed state of the mobile electronic equipment, a user can manipulate the track ball in any of the opened state and the closed state. Accordingly, there can be overcome the disadvantageous operability of a conventional folding type mobile electronic equipment, which has a track ball as a pointing device, in that a job for opening the equipment is required to manipulate the track ball.

13 Claims, 4 Drawing Sheets

FOREIGN PATENT DOCUMENTS

| | | |
|---|---|---|
| JP | 2003-018257 | 1/2003 |
| JP | 2003-29896 | 1/2003 |
| JP | 2003-037664 | 2/2003 |
| JP | 2003-122499 | 4/2003 |
| JP | 2003-134212 | 5/2003 |
| JP | 2003-319041 | 11/2003 |
| JP | 2003-333139 | 11/2003 |

OTHER PUBLICATIONS

An Office Action issued by the Japanese Patent Office on Nov. 6, 2007, with English language translation, pp. 1 to 6.

FIG.2

MOBILE ELECTRONIC EQUIPMENT

BACKGROUND OF THE INVENTION

1. Field of the Invention

The present invention relates to a mobile electronic equipment, and more particularly, to an mobile electronic equipment such as a folding mobile electronic equipment and the like having a track ball acting as a pointing device for executing manipulations of moving a cursor displayed on a display unit and scrolling a screen on the display unit.

2. Description of the Related Art

In mobile electronic equipment such as a mobile phone and the like, operability is one of the important technical factors. Although pointing devices such as a four-way key, a rotary (jog) key, and the like are used to execute manipulations of, for example, moving a cursor displayed on a display unit and scrolling a screen, a pointing device using a track ball is conventionally known as an example of the pointing devices (for example, refer to Japanese Patent Application Laid-Open (JP-A) Nos. 10-254617 and 2003-29896).

The conventional mobile electronic equipment disclosed in JP-A No. 10-254617 includes a track ball disposed to a main body, and the track ball acts as a coordinate input unit. The track ball permits a coordinate to be input on a display unit as well as can be rotated from two directions, that is, from an upper surface and a lower surface, and respective rotating manipulations can be detected.

The conventional mobile electronic equipment disclosed in JP-A No. 2003-29896 is a mobile terminal including a track ball manipulation means. In the mobile terminal, the information displayed on a display screen is selected or moved by rotating a track ball, and the mobile terminal includes a track ball, a track ball rotating speed detection means, and a display control means which switches an operation for selecting or moving the information on the display screen when a track ball rotating speed is faster than a predetermined threshold value.

However, when the conventional mobile electronic equipment disclosed in JP-A No. 10-254617 is applied to a folding type electronic equipment in which a lower cabinet is pivotably coupled with an upper cabinet at one side ends thereof through a hinge portion and which is used in the opened state, in which the inside surfaces of the lower and upper cabinets are separated from each other, or in the closed state, in which the inside surfaces thereof are disposed in close proximity to each other, the track ball cannot be manipulated unless the mobile electronic equipment is placed in the opened state because the track ball is disposed at a central portion of the lower cabinet. Accordingly, since the conventional mobile electronic equipment disclosed in JP-A No. 10-254617 requires a user action of placing the equipment in the opened state, the equipment is disadvantageous in operability.

The conventional mobile electronic equipment disclosed in JP-A No. 2003-29896 includes the track ball whose upper portion is exposed at the central portion of a main body. Therefore, when the electronic equipment is applied to a folding type electronic equipment, a job for placing the equipment in an opened state is required likewise the mobile electronic equipment disclosed in JP-A No. 10-254617. Further, since the upper portion of the track ball is exposed from the surface of the cabinet, it is impossible to manipulate the track ball by simultaneously holding the upper portion and the lower portion thereof from the front surface and a back surface of the cabinet. Thus, the mobile electronic equipment also has a drawback in operability.

SUMMARY OF THE INVENTION

An object of the present invention, which was made in view of the above problems, is to provide a mobile electronic equipment capable of using a track ball in a closed state to thereby improve the operability of the equipment when the present invention is applied to a folding type electronic equipment.

Another object of the present invention is to provide a mobile electronic equipment in which the track ball can be applied to uses other than an input of a coordinate.

A mobile electronic equipment of the present invention includes an upper cabinet having a display mechanism, a lower cabinet having a manipulation mechanism, a hinge mechanism connecting both the cabinets so that they can be folded, a track ball exposed from both the cabinets in both an opened state and a closed state in which the cabinets are opened or closed by the hinge mechanism, a means for rotatably supporting the track ball, a means for detecting the rotation angles of the track ball, a means for calculating the moving direction and the amounts of movement of an image on the display mechanism based on the detected rotation angles, and a means for changing the image on the display mechanism based on the calculated moving direction and amounts of movement.

A mobile electronic equipment of the present invention includes the display mechanism of the upper cabinet having a main display unit for display a screen in the opened state of both the cabinets, an auxiliary display unit for display a screen in the closed state of both the cabinets, and a manipulation unit for inputting an instruction to the screen of the auxiliary display unit.

A mobile electronic equipment of the present invention detects the rotation angles in two orthogonal directions by the means for detecting the rotation angles of the track ball.

A mobile electronic equipment of the present invention further includes means for allocating predetermined processing to a combination of the rotation of the track ball and the manipulation content of the manipulation mechanism.

A mobile electronic equipment of the present invention includes means for supporting the track ball so that a depressing manipulation can be executed to the track ball, and means for detecting the depressing manipulation executed to the track ball, changing when the depressing manipulation executed to the track ball is detected, an image on the display mechanism.

A mobile electronic equipment of the present invention includes the means for detecting the depressing manipulation of the track ball having a magnetic body, and a detector detecting the presence or absence of the magnet applied by the magnetic body.

A mobile electronic equipment of the present invention includes means for transmitting a signal to other equipment through a near distance radio communication when the depressing manipulation of the track ball is detected to cause the other equipment to execute a preset operation.

A mobile electronic equipment of the present invention includes the means for rotatably supporting track ball having support tables connected to any one inside walls of both the cabinets, and a plurality of spherical bodies connected to the support tables as well as in contact with the track ball.

A mobile electronic equipment of the present invention includes the means for supporting the track ball so that it can be depressed having springs connected between the inside walls and the support tables.

A mobile electronic equipment of the present invention includes the means for detecting the rotation angles of the track ball having rollers coming into contact with the track ball and rotated by the rotation of the track ball.

A mobile electronic equipment of the present invention includes each of the upper cabinet and the lower cabinet has cutout portion for exposing the track ball from itself.

A mobile electronic equipment of the present invention includes the hinge mechanism having a pair of hinges disposed across the track ball between both the cabinets.

A mobile electronic equipment of the present invention further includes means for executing a phone call to other equipment.

According to the present invention, since the track ball is exposed in both the opened state and the closed state of the mobile electronic equipment, a user can manipulate the track ball in any of the opened state and the closed state. The above arrangement can greatly improve the operability of the mobile electronic equipment as compared with that of conventional mobile electronic equipment.

DESCRIPTION OF THE PREFERRED EMBODIMENT

Figures 1A, 1B:
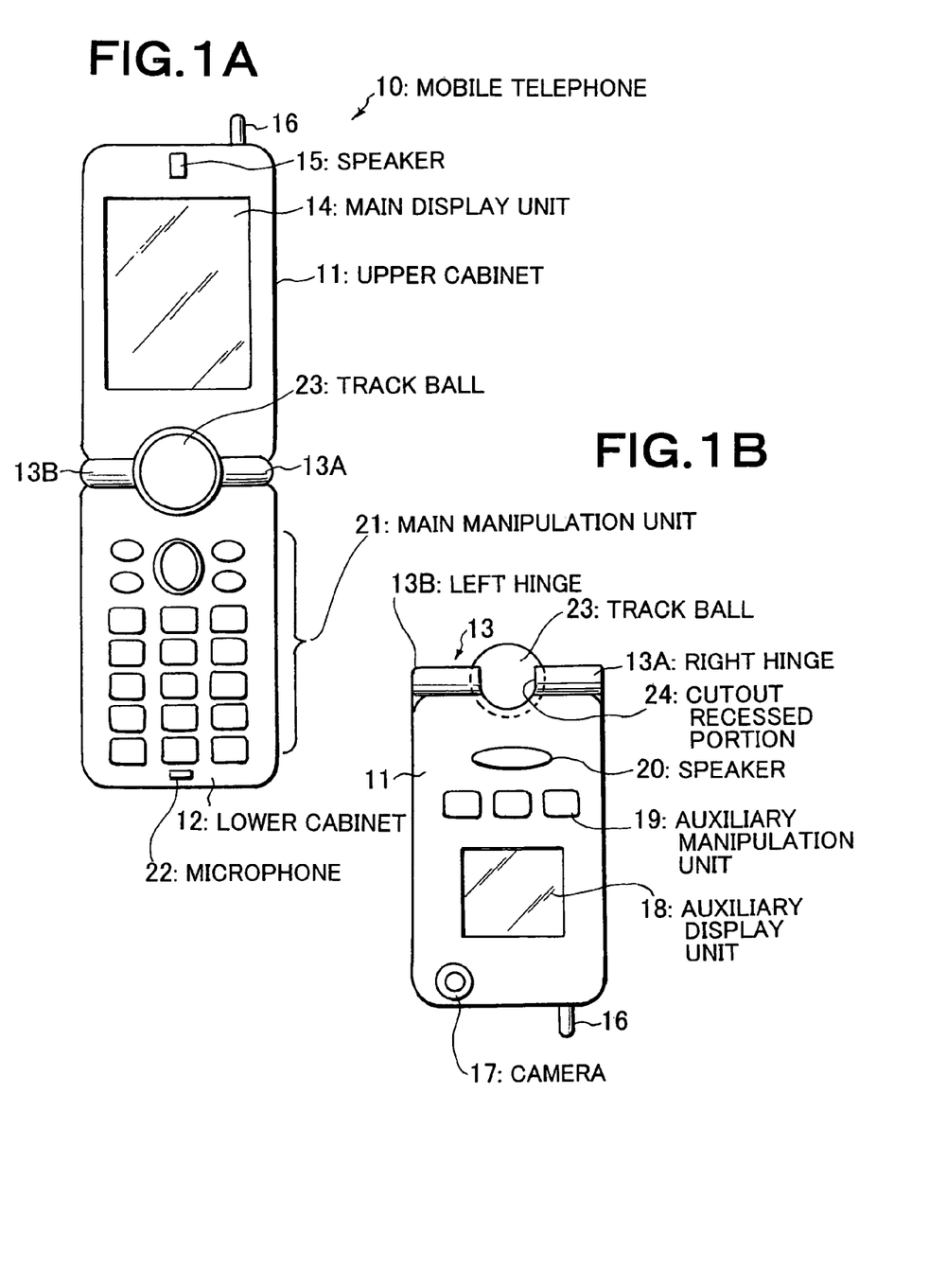
FIG. 1A is an outside view of a mobile electronic equipment of an embodiment of the present invention in an opened state.
FIG. 1B is an outside view of the mobile electronic equipment of the embodiment of the present invention in a closed state.

An embodiment of a mobile electronic equipment of the present invention will be explained below with reference to the drawings. FIGS. 1A and 1B show outside views of the mobile electronic equipment of the embodiment according to the present invention in an opened state and in a closed state, respectively. The mobile electronic equipment of the embodiment is a folding type mobile phone 10 composed of an upper cabinet 11 and a lower cabinet 12 pivotably coupled with each other at one of their respective ends through a hinge portion 13. When the mobile phone 10 is placed in the opened state in which the inside surfaces of the upper and lower cabinets 11 and 12 are separated from each other about the hinge portion 13, a main display unit 14, which has a large screen, is disposed on the inside surface of the upper cabinet 11 and displays various kinds of information, and a speaker 15 for generating a received voice and the like are exposed as shown in FIG. 1A. An antenna 16 is disposed at the upper end of the upper cabinet 11.

The hinge portion 13 is composed of a right hinge 13A and a left hinge 13B. The hinge portion 13 has a mechanism for applying torque (torque application mechanism) to enhance a feeling of manipulation as an ordinary function thereof, and the torque application mechanism may be provided with both the right and left hinges 13A and 13B or any one of them. In particular, when the upper cabinet 11 is connected to the lower cabinet 12 through a not shown flat cable, the flat cable may be connected to the cabinets 11 and 12 making use of the space of the hinge portion without the torque application mechanism. A track ball 23 is disposed so as to be sandwiched between the right hinge 13A and the left hinge 13B and partially exposed in the opened state of the mobile phone 10.

A main manipulation unit 21 and a microphone 22 are exposed in the opened state of the mobile phone 10. The main manipulation unit 21 is disposed on the inside surface of the lower cabinet 12 and composed of a determination button, ten key buttons, and the like, and the microphone 22 collects a received voice and outputs a voice signal by subjecting the received voice to acoustic-electric conversion.

In contrast, in the closed state, a camera 17, an auxiliary display unit 18, an auxiliary manipulation unit 19, and a speaker 20 are exposed as shown in FIG. 1B. The camera 17 is disposed on the back surface (outside surface) of the upper cabinet 11 and records a subject image, the auxiliary display unit 18 has a small area and displays various kinds of information, the auxiliary manipulation unit 19 is used to execute a simple input manipulation therethrough, and the speaker 20 subjects an electric signal to the voice by electro-acoustic conversion and generates a notification sound and the like. Accordingly, the camera 17 and the auxiliary manipulation unit 19 can be manipulated in the closed state. Further, as shown in FIG. 1B, the track ball 23 is exposed from between cutout concave portions 24 formed in the central portions of the upper and lower cabinets 11 and 12 and from between the right and left hinges 13A and 13B.

As apparent from the internal structure of the mobile phone 10 which will be explained later, the track ball 23 is held by the cutout concave portions 24 such that it can be rotatably manipulated and exposed from both of one main surface and the other main surface of each of the cabinets.

Figure 2:
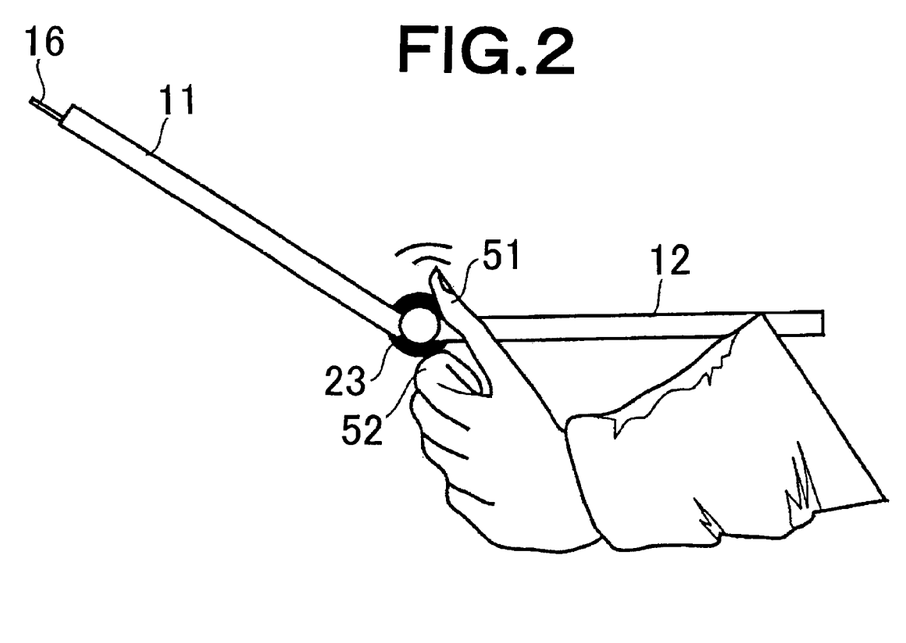
FIG. 2 is a view showing an example of a manipulation method of the mobile electronic equipment of the embodiment of the present invention.

Since the mobile phone 10 is arranged such that a part of the track ball 23 is exposed in any of the opened state and the closed state as described above, a user can rotate the track ball 23 by holding it between a thumb 51 and a forefinger 52 from both the upper and lower surfaces of the lower cabinet 12. Note that although FIG. 2 shows the mobile phone 10 in the opened state, the exposed track ball 12 can be rotated likewise even if the mobile phone 10 is in the closed state as shown in FIG. 1B.

Figure 3:
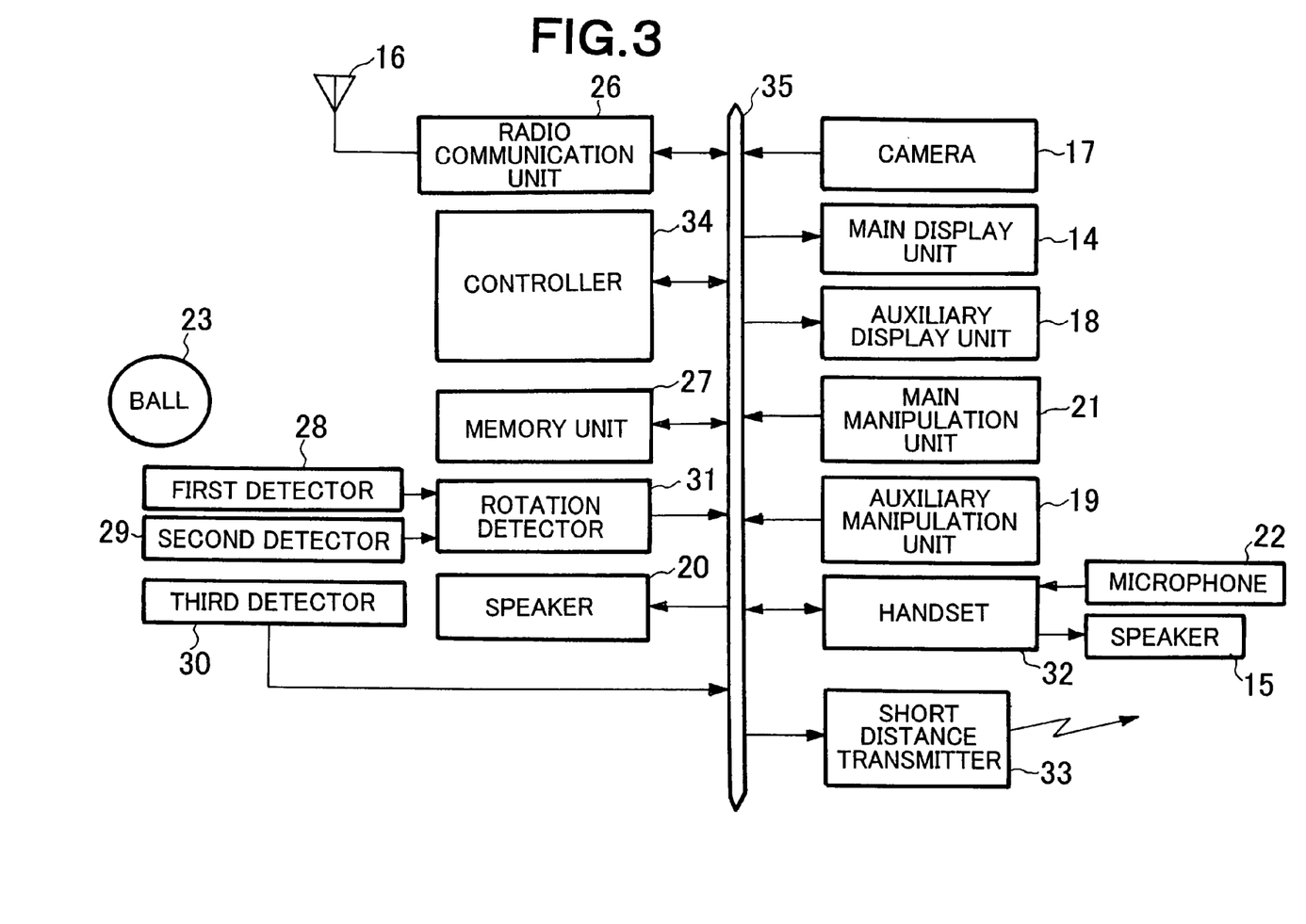
FIG. 3 is a block diagram of the mobile electronic equipment of the embodiment of the present invention.

FIG. 3 shows a block diagram of the embodiment of the mobile electronic equipment according to the present invention. In FIG. 3, the same components as those shown in FIG. 1 are denoted by the same reference numerals and the explanation thereof is omitted. In FIG. 3, a radio communication unit 26, a memory unit 27, first, second, and third detectors 28, 29, and 30, a rotation detector 31, a handset 32, a short distance transmitter 33, and a controller 34 are disposed in the upper cabinet 11 or the lower cabinet 12. The radio communication unit 26 transmits and receives a radio signal to and from a not shown radio base station through the antenna 16, the memory unit 27 stores telephone directory information, information of transmitted and received mails, information of sent and received calls, and the like, various settings of a mobile phone terminal, the first, second, and third detectors 28, 29, and 30 independently detects the x-, y-, and z-coordinates in the rotating direction of the track ball (ball) 23, the rotation detector 31 converts rotation data into movement data in response to the outputs from the first and second detectors 28 and 29, the handset 32 receives the voice signal from the microphone 22 as an input and outputs the receiving voice signal to the speaker 15, the short distance transmitter 33 executes short distance transmission using an extremely weak radio wave such as a blue tooth and the like, and the controller 34 centrally controls the respective units including the track ball 23 of the mobile phone terminal and controls a phone function, a mail function, a camera function, and the like, and the respective units are connected to each other through a bidirectional bus 35.

Figure 4:
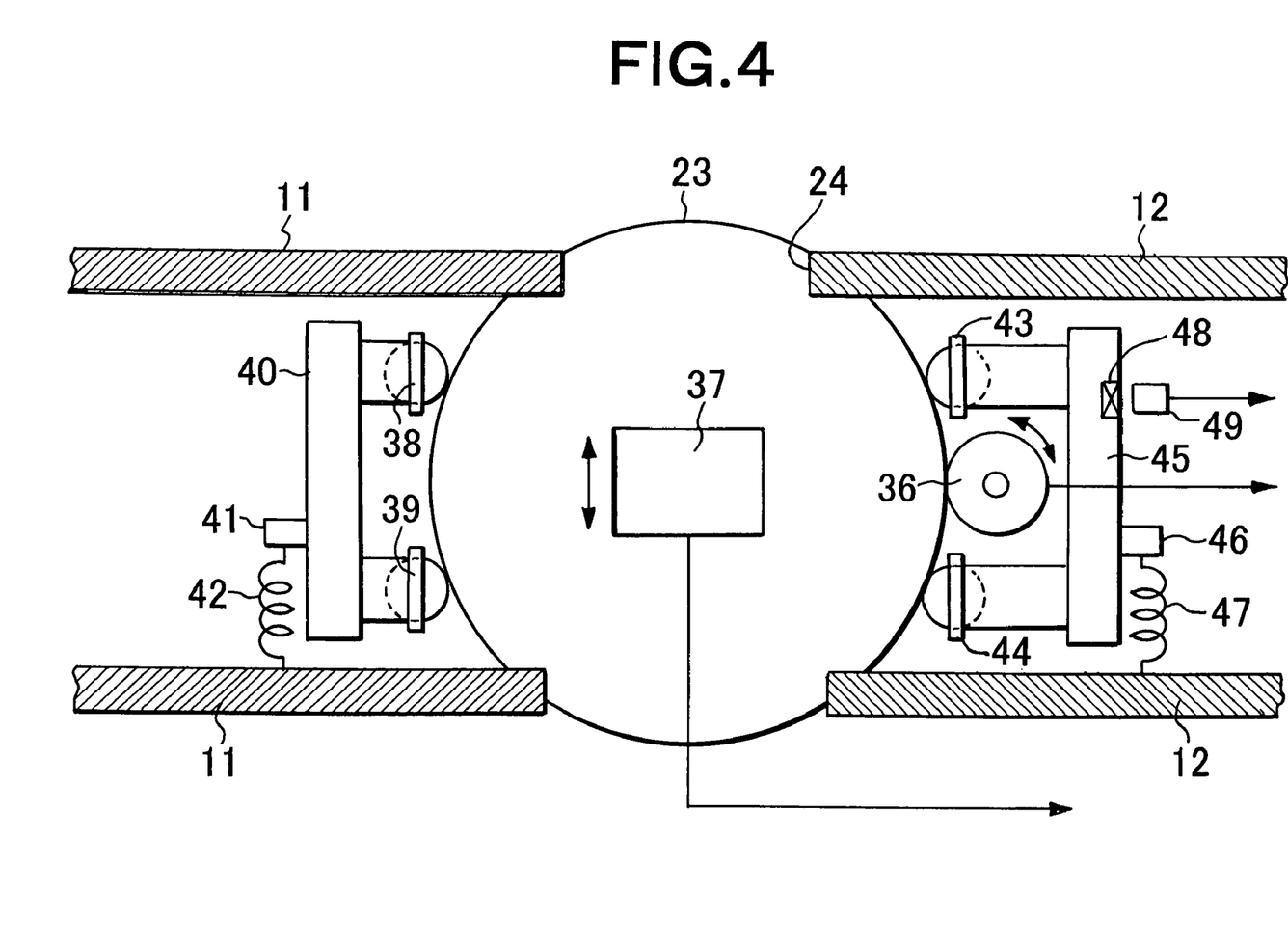
FIG. 4 is a sectional view showing a schematic structure of a main portion of the mobile electronic equipment of the embodiment of the present invention.

FIG. 4 is a sectional view showing a schematic structure of an example of the periphery of the track ball 23 as a main portion of the mobile phone 10 of the embodiment. In FIG. 4, the same components as those in FIGS. 1 to 3 are denoted by the same reference numerals. As shown in FIG. 4, the track ball 23 is partially exposed from the front and back surfaces of the upper and lower cabinets 11 and 12 between the not shown right and left hinges 13A and 13B.

Further, rotation detection rollers 36 and 37 are disposed around an equator which defines the circumference of the track ball 23 at the positions having an elevation angle of 90° such that they are in contact with the surface of the track ball 23. The rotation detection rollers 36 and 37 correspond to the first and second detectors 28 and 29 shown in FIG. 3, have fixed central shafts, and are rotated by the rotation of the track ball 23. Further, fixing ball casters 38 and 39, which are fixed to a support table 40 of the upper cabinet 11, and fixing ball casters 43 and 44, which are fixed to a support table 45 of the lower cabinet 12, are in contact with the track ball 23.

The support table 40 has a projection 41 disposed thereto, and force is applied to the support table 40 in a vertical direction in FIG. 4 by a spring 42 having one end fixed to the projection 41 and the other end fixed to the lower cabinet 12. In contrast, the support table 45 also has a projection 46 disposed thereto, and force is applied to the support table 45 in a vertical direction in FIG. 4 by a spring 47 having one end fixed to the projection 46 and the other end fixed to the lower cabinet 12,. Note that rails for vertically movably clamping and guiding the support tables 40 and 45 may be provided in place of the springs 42 and 47. In this case, the support tables 40 and 45 can be stably moved vertically.

In an initial state in which no force is applied to the track ball 23 by the user in the z-axis direction (vertical direction in FIG. 4), the support tables 40 and 45 are located at illustrated positions by the springs 42 and 47, and the track ball 23 is rotatably fixed at a position having an illustrated height by the fixing ball casters 38, 39, 43, and 44. A magnetic body 48 is disposed to a part of the support table 45 of the lower cabinet 12, and when the support table 45 is in the initial state shown in FIG. 4, that is, when no vertical force is applied to the track ball 23, the magnetic body 48 is located at a position where it is located in close proximity to a magnet detector 49 at intervals. At the time, the magnetic body 48 is located within a detection range of the magnet detector 49, and the magnet detector 49 outputs a magnet detection signal.

In contrast, when downward force is applied to the track ball 23 by the user against the spring force of the springs 42 and 47, the track ball 23 is moved downward together with the support tables 40 and 45 while being fixed by the fixing ball casters 38, 39, 43, and 44. When the magnetic body 48 is moved to the outside of the magnet detection range of the magnet detector 49 by the movement of the track ball 23, no magnet detection signal is output from the magnet detector 49, thereby the downward movement of the track ball 23 is detected.

When the downward press force is released from the track ball 23, the track ball 23 is automatically returned to the ordinary original position shown in FIG. 4 together with the support tables 40 and 45 while being fixed by the fixing ball casters 38, 39, 43, and 44 by the extended spring force of the springs 42 and 47. With the above operation, a magnet detection signal is output from the magnet detector 49 again, thereby it is detected that the track ball 23 is returned to the illustrated initial state. The third detector 30 is composed of the magnetic body 48 and the magnet detector 49.

Next, an operation of the folding type mobile phone 10 of the embodiment will be explained. When an ordinary phone call is made in the mobile phone 10, the phone number of a calling party is input by manipulating the main manipulation unit 21, thereby a dial signal is created by the controller 34 and radio transmitted to a nearest radio base station through the radio communication unit 26 and the antenna 16. When a phone call is received, an incoming signal from a calling party's terminal is received from a nearest radio base station through a network and the antenna 16 and further an incoming tone is issued by the speaker 15 through the bus 35 and the handset 32. Then, a communication circuit is established from the radio base station to the calling party's terminal through the network according to a predetermined protocol by responding to the incoming tone by manipulating the main manipulation unit 21.

With the above operation, a voice signal from the calling party's terminal is received and demodulated by the radio communication unit 26 through the antenna 16 and issued from the speaker 15 through the bus 35 and the handset 32. In contrast, a transmitted voice is converted into a transmitted voice signal by the microphone 22, supplied to the radio communication unit 26 through the bus 35, converted into a transmission signal by being subjected to modulation and the like, and radio transmitted to a nearest radio base station. An E-mail is also transmitted and received approximately likewise the voice communication described above.

Although the voice and E-mail communications are executed in the same way as conventional ones, an operation for scrolling the images of the phone directory and the like displayed on the main display unit 14 or the auxiliary display unit 18 will be explained. In this case, the user rotates the track ball 23 in a scroll direction by holding it between the thumb 51 in contact with the upper surface of the track ball 23 and, for example, the forefinger 52 in contact with the lower surface thereof as shown in FIG. 2.

The rotation angles of the track ball 23 is detected by the first and second detectors 28 and 29 which are the rotation detection rollers 36 and 37. The rotation angles of the track ball 23, which are detected by the first and second detectors 28 and 29 is converted into an amount of movement in an x-direction and an amount of movement in a y-direction by the rotation detector 31, and then supplied to the controller 34 through the bus 35. The controller 34 scrolls the images of the phone directory and the like displayed on the main display unit 14 or the auxiliary display unit 18 according to the input data of the amounts of movement in the x- and y-directions in conformity with the rotating direction of the track ball 23.

As described above, according to the mobile phone 10 of the embodiment, since the track ball 23 is mounted so as to project from the center of the hinge portion, the track ball 23 can be manipulated delicately from both the surfaces thereof by holding it between the thumb 51 (upper surface) and the forefinger 52 (lower surface). Accordingly, when, for example, the phone directory is searched by scroll or a displayed screen is scrolled, the mobile phone 10 can be easily manipulated regardless that the cabinets thereof are opened or closed.

Further, according to the embodiment, since the track ball 23 is exposed at all times regardless that the mobile phone 10 is opened or closed, an address, a transmitted/received call history, a mail, and the like can be confirmed using the auxiliary manipulation unit 19 on the back surface and the track ball 23 even if the mobile phone 10 is closed.

Incidentally, although an operation executed by rotating the track ball 23 is described above, selection or determination can be executed by depressing the track ball 23 in a vertically downward direction, specifically, in a downward direction in FIG. 4. In this case, the third detector 30 detects the depression of the track ball 23 as explained in FIG. 4, and a magnetic detection signal detected thereby is supplied to the controller 34 through the bus 35. When the magnetic detection signal is input to the controller 34, there is executed processing for selecting or determining information (menu item and the like) displayed on, for example, the main display unit 14 or the auxiliary display unit 18 at the position designated by a cursor located at a desired position.

Note that when the third detector 30 detects the depression of the track ball 23, it is also possible for the controller 34 received the detection signal drives the short distance transmitter 33 to cause it to transmit a radio signal. When the radio signal is received by a short distance receiver provided with not shown equipment acting as a communication party, a desired menu is selected and determined from a plurality of menu images displayed on a monitor screen of the equipment or a predetermined preset operation is executed by a known means. With the above arrangement, the versatility of manipulation and control of the equipment can be greatly extended as compared with conventional equipment.

Note that the controller 34 may allocate a special manipulation (start of a predetermined program) based on the signal detected by the third detector 30, based on a combination input executed through the auxiliary manipulation unit 19 on the outside surface of the upper cabinet 11 and the main manipulation unit 21 on the inside surface of the lower cabinet 12, based on a combination input executed by depressing the main manipulation unit 21 (or the auxiliary manipulation unit 19) while rotating the track ball 23, or the like. With the above operation, functions more than those of the conventional equipment can be provided.

When the rotation detector 31 converts the rotation angles output from the first and second detectors 28 and 29 into the data of the amounts of movement, a different conversion ratio may be used to the output from the first detector 28 and the output from the second detector 29.

The present invention is by no means limited to the embodiment described above. That is, although the folding type mobile phone in which the upper cabinet 11 is connected to the lower cabinet 12 through the hinge mechanism is explained in the above embodiment, the present invention can be also applied to a slide type mobile phone which is opened or closed by swiveling one of cabinets on a surface parallel with the surface of the other cabinet. Further, the structure for permitting the track ball 23 to be depressed in the vertical direction and the detection means for detecting the depression thereof are not limited to those disclosed in the embodiment shown in FIG. 4, and various modifications such as detecting the vertical movement of the track ball 23 by a limit switch may be employed.

It is needless to say that the present invention can be applied to folding type mobile information equipment such as a notebook personal computer and the like, in addition to the mobile phone. The auxiliary display unit 18, the auxiliary manipulation unit 19, the speaker 20, and the like may be disposed on the lower cabinet 12. The camera 17 and the short distance transmitter 33 may not be necessarily provided. The track ball 23 need not be disposed at the center of the hinge portion 13 and may be dislocated toward any of the right or left side thereof.

What is claimed is:

1. A mobile electronic equipment comprising:
    an upper cabinet having an inside surface, an outside surface opposite to said inside surface, and an end, and having a display mechanism;
    a hinge mechanism connected to the end of the upper cabinet;
    a lower cabinet having an inside surface, an outside surface opposite said inside surface, and an end connected to said hinge mechanism to provide pivotable movement of said lower cabinet relative to said upper cabinet, from a closed state at which the inside surface of the lower cabinet faces against the inside surface of the upper cabinet to an open state, and having a manipulation mechanism;
    means for rotatably supporting a trackball in relation to said upper cabinet, said lower cabinet and said hinge mechanism, said means having surfaces for contacting a trackball;
    a track ball supported by said means for rotatably supporting a trackball to have an exposed surface when said upper and lower cabinets are in the opened state and in the closed state;
    means for detecting the rotation angles of the track ball;
    means for calculating the moving direction and the amounts of movement of an image on the display mechanism based on the detected rotation angles; and
    means for changing the image on the display mechanism based on the calculated moving direction and amounts of movement,
    wherein said lower cabinet, said means for rotatably supporting a trackball and said trackball are arranged to provide, when the upper cabinet and the lower cabinet are in the open state, an exposed surface area of said trackball located above the inside surface of the lower cabinet and, concurrently, an exposed surface area of said trackball located under the outside surface of the lower cabinet.

2. The mobile electronic equipment of claim 1, wherein the display mechanism of the upper cabinet comprises:
    a main display unit having a screen arranged on the inside surface of the upper cabinet, for display in the opened state;
    an auxiliary display unit having a screen arranged on the outside surface of the upper cabinet, for display in the closed state; and
    a manipulation unit for inputting an instruction to the screen of the auxiliary display unit.

3. The mobile electronic equipment of claim 1, wherein the means for detecting the rotation angles of the track ball detects rotation angles in two orthogonal directions.

4. The mobile electronic equipment of claim 1, further comprising means for allocating predetermined processing to a combination of the rotation of the track ball and the manipulation content of the manipulation mechanism.

5. The mobile electronic equipment of claim 1
    wherein said means for supporting the track ball includes means for movably supporting the trackball to be movable in a depress direction in response to a depressing manipulation manually executed to the track ball and wherein said mobile electronic equipment further comprises
    means for detecting the depressing manipulation executed to the track ball, and
    wherein when said means for changing the image on the display mechanism, in response to said detecting the depressing manipulation executed to the track ball, changes an image on the display mechanism.

6. The mobile electronic equipment of claim 5, wherein the means for detecting the depressing manipulation of the track ball comprises a magnetic body, and a detector detecting the presence or absence of the magnet applied by the magnetic body.

7. The mobile electronic equipment of claim 5, further comprising means for transmitting a signal to other equipment through a near distance radio communication in response to said detecting the depressing manipulation of the track ball is detected.

8. The mobile electronic equipment of claim 1, wherein said upper cabinet includes inner walls enclosing an upper cabinet inner space and the lower cabinet includes inner walls enclosing a lower cabinet upper space, and wherein the means for rotatably supporting track ball comprises:
- support tables connected to at least one of the inside walls of the lower cabinet and at least one of the inside walls of the upper cabinet ; and
- a plurality of spherical bodies connected to the support tables and in contact with the track ball.

9. The mobile electronic equipment of claim 8, wherein the means for supporting the track ball further comprises springs connected between the support tables and one of the least one inside surface of the lower cabinet and the at least one inside surface of the upper cabinet.

10. The mobile electronic equipment of claim 1, wherein the means for detecting the rotation angles of the track ball comprises rollers arranged to contact the track ball and to be rotated by the rotation of the track ball.

11. The mobile electronic equipment of claim 1, wherein each of the upper cabinet and the lower cabinet has a cutout portion for exposing the track ball.

12. The mobile electronic equipment of claim 11, wherein the hinge mechanism comprises a pair of hinges, one hinge of said pair disposed on one side of the track ball and the other hinge of said pair disposed on a side of said trackball diametrically opposite said one side.

13. The mobile electronic equipment of claim 1, further comprising means for executing a phone call to other equipment.

* * * * *